Figure 1:
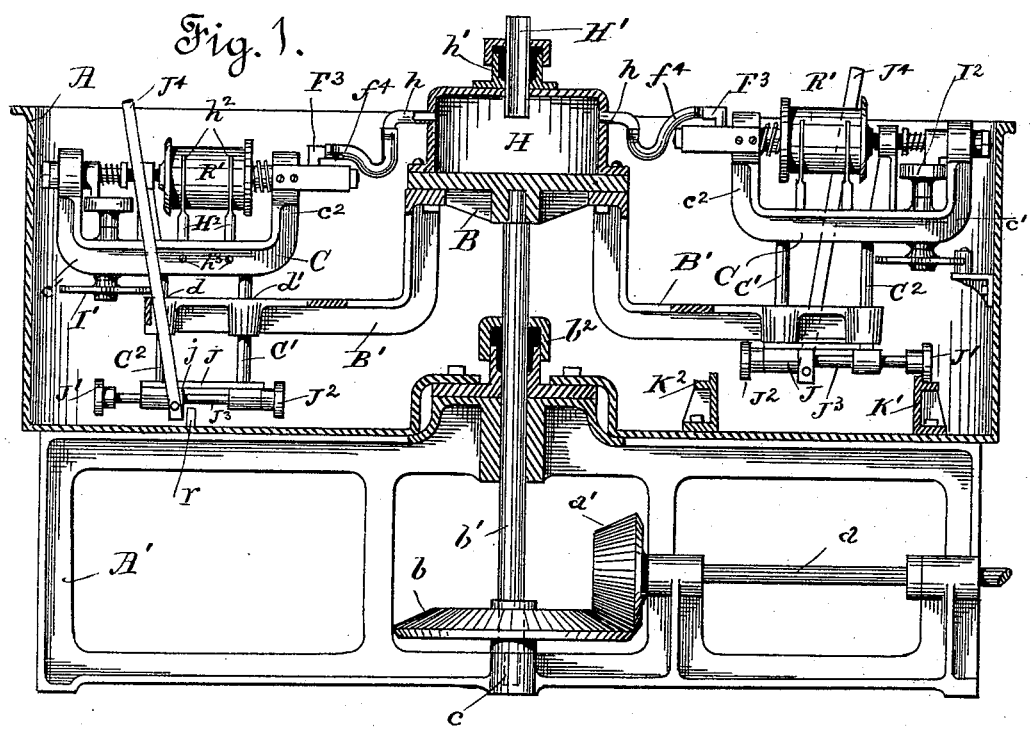

(No Model.) 5 Sheets—Sheet 1.

C. B. KENDALL & H. SCHAAKE.
CAN TESTING MACHINE.

No. 481,764. Patented Aug. 30, 1892.

Witnesses.

Inventors
Charles B. Kendall
and
Henry Schaake
By N. A. Acker
Atty (No Model.) 5 Sheets—Sheet 2.
C. B. KENDALL & H. SCHAAKE.
CAN TESTING MACHINE.
No. 481,764. Patented Aug. 30, 1892.
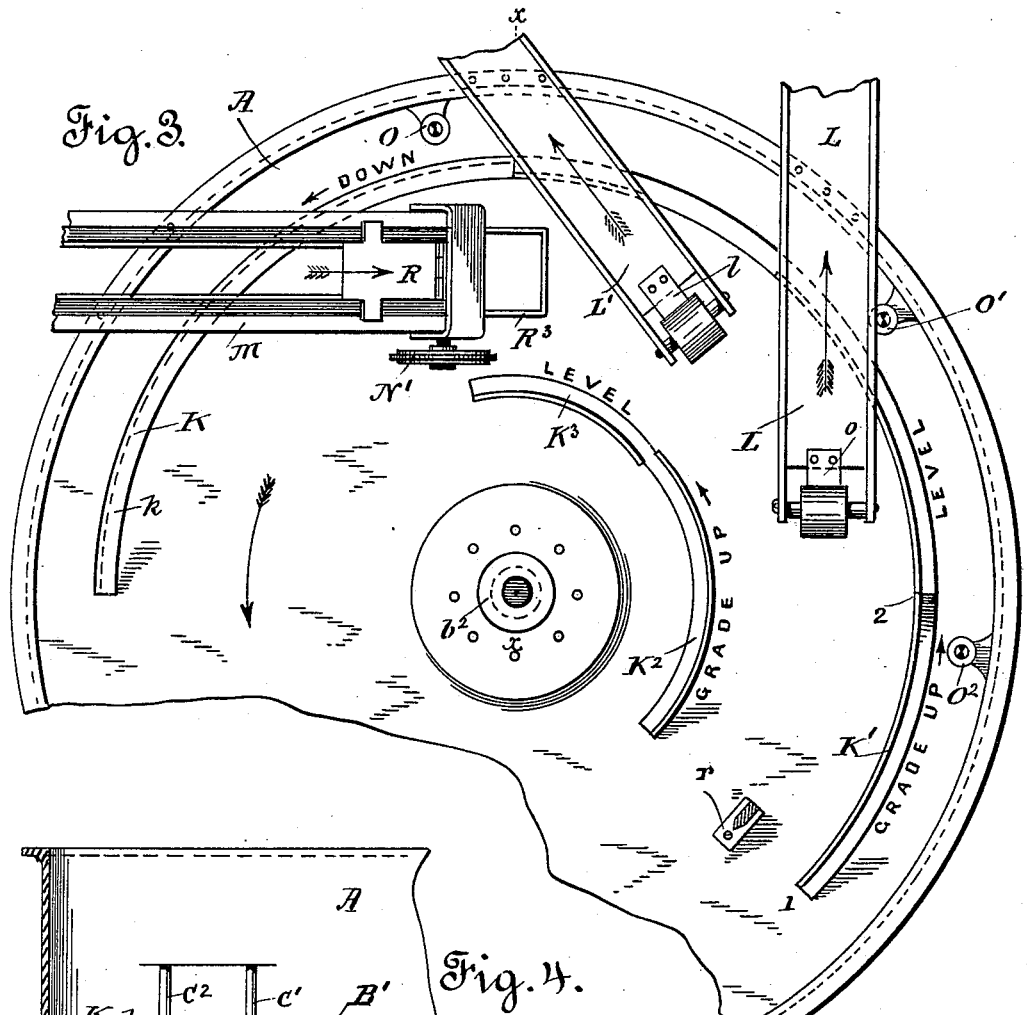
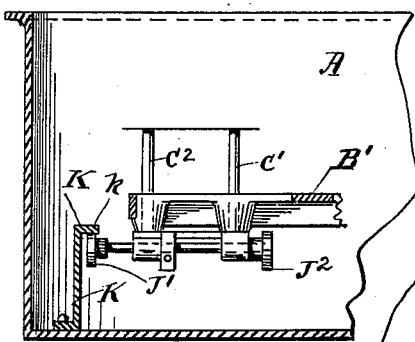
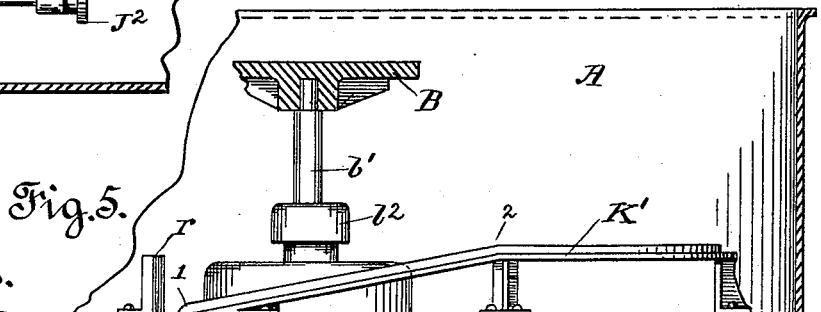
Witnesses.
H. Monteverde
J. C. McKee
Inventors
Charles B. Kendall
and
Henry Schaake
By W. A. Acker Atty (No Model.) 5 Sheets—Sheet 3.
C. B. KENDALL & H. SCHAAKE.
CAN TESTING MACHINE.
No. 481,764. Patented Aug. 30, 1892.
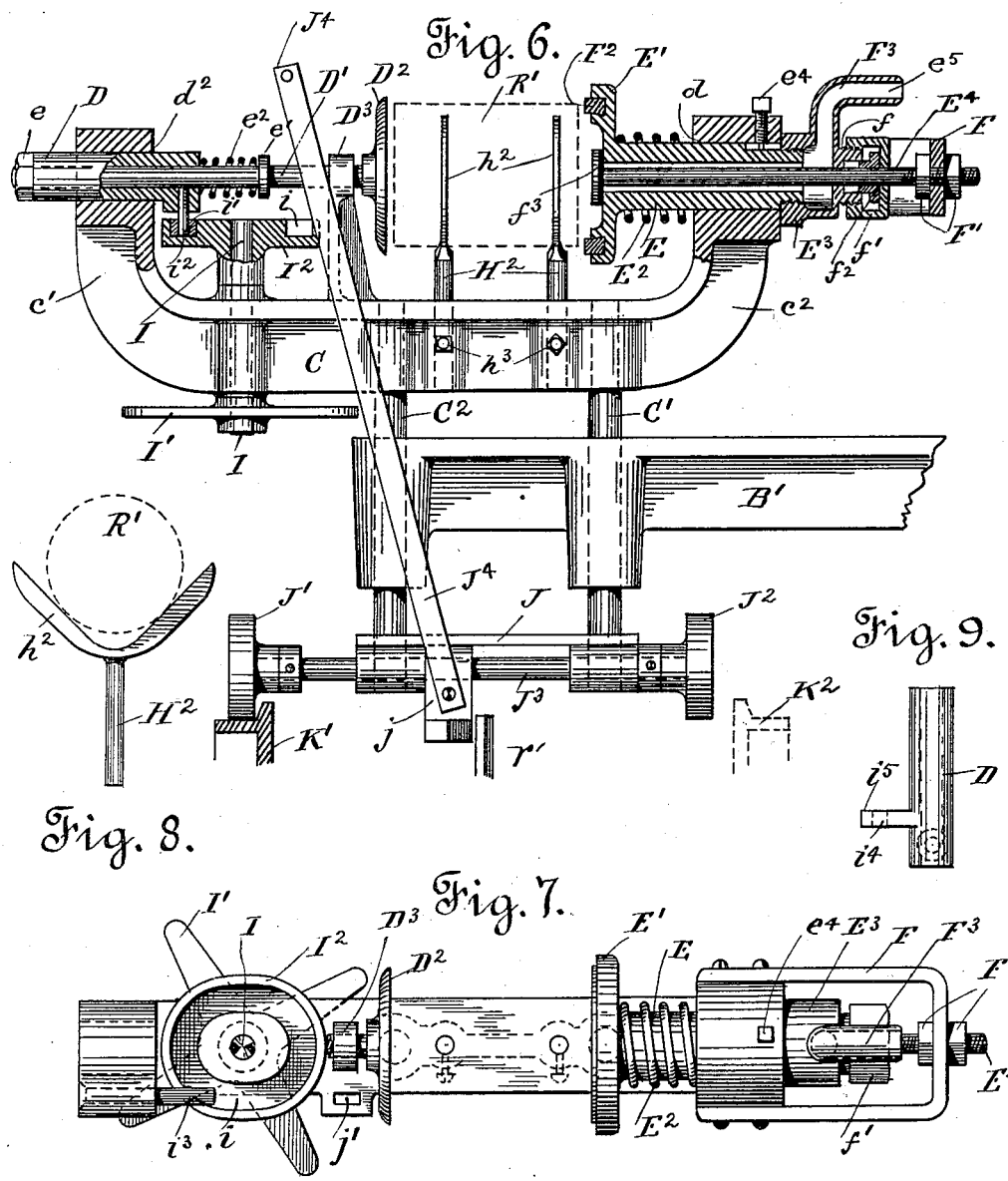

(No Model.) 5 Sheets—Sheet 4.
C. B. KENDALL & H. SCHAAKE.
CAN TESTING MACHINE.
No. 481,764. Patented Aug. 30, 1892.
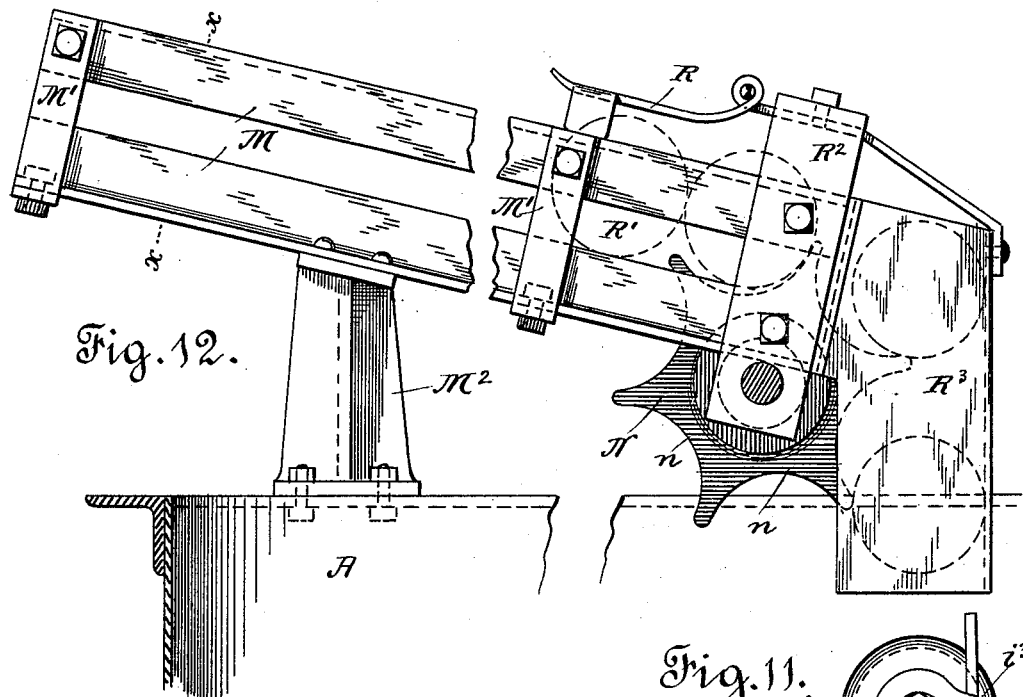
Fig. 12.
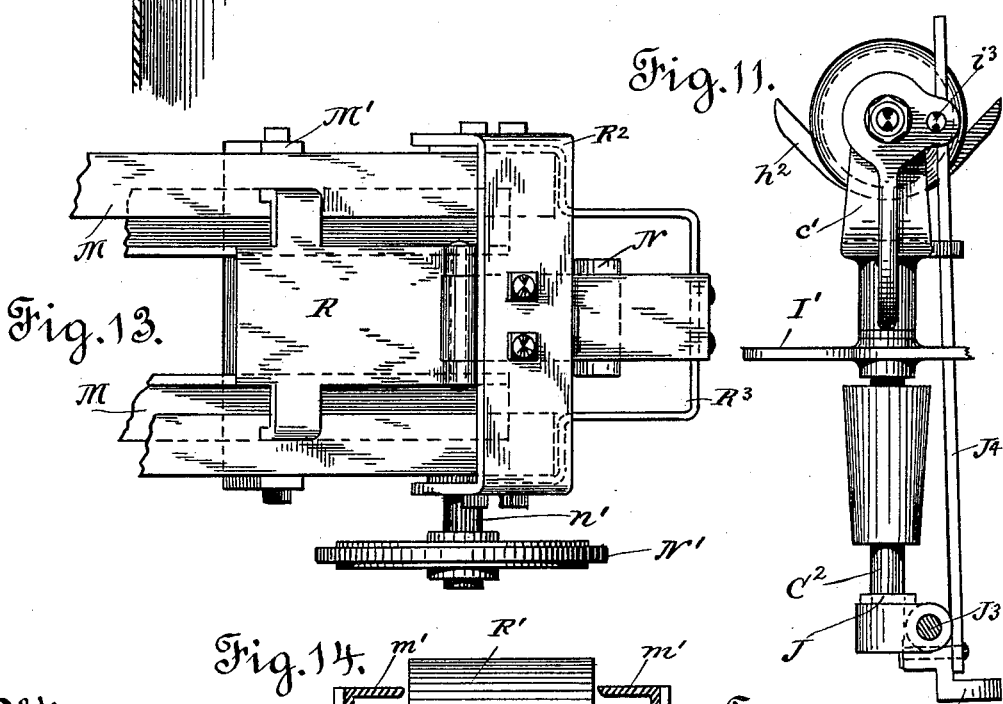
Fig. 11.
Fig. 13.
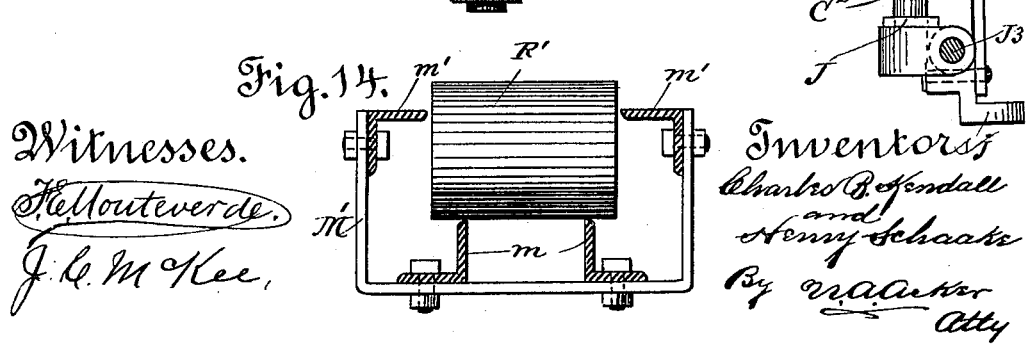
Fig. 14.
Witnesses.
Inventors:
Charles B. Kendall
and
Henry Schaake
By W. A. Acker
Atty (No Model.) 5 Sheets—Sheet 5.

C. B. KENDALL & H. SCHAAKE.
CAN TESTING MACHINE.

No. 481,764. Patented Aug. 30, 1892.

Witnesses.
Inventors
Charles B. Kendall
and
Henry Schaake
By W. A. Acker
Atty

UNITED STATES PATENT OFFICE.

CHARLES B. KENDALL, OF NEWTON, MASSACHUSETTS, AND HENRY SCHAAKE, OF BALTIMORE, MARYLAND; SAID SCHAAKE ASSIGNOR TO SAID KENDALL.

CAN-TESTING MACHINE.

SPECIFICATION forming part of Letters Patent No. 481,764, dated August 30, 1892.

Application filed February 2, 1892. Serial No. 420,053. (No model.)

*To all whom it may concern:*

Be it known that we, CHARLES B. KENDALL residing at Newton, county of Middlesex, State of Massachusetts, and HENRY SCHAAKE, residing at Baltimore, State of Maryland, citizens of the United States, have invented certain new and useful Improvements in Can-Testing Machines; and we do hereby declare the following to be a full, clear, and exact description of said invention, such as will enable others skilled in the art to which it most nearly appertains to make, use, and practice the same.

Our invention relates to certain new and useful can-testing machinery, and more particularly to that class of testers wherein the cans when filled with compressed air are submerged within a liquid bath; and it consists in the arrangement of parts and details of construction hereinafter more fully set forth in the drawings and described and pointed out in the specification.

In the above class of testers one of the greatest annoyances which the operator has to contend with consists in the fact that in all such machines the cans filled with compressed air are submerged into a still bath either at an inclined or vertical dip, which submerging serves to agitate the liquid and create bubbles which tend to deceive the operator, inasmuch as it is only by the bubbles created by air escaping from within the vessel that he can ascertain whether the vessel being tested is good or bad. Consequently as the water by the use of the present machines is continually kept agitated by the vertical and inclined dip of the vessel and traveling trucks it will readily be seen that what is often bubbles caused by the escape of air contained within the submerged vessel is mistaken for natural agitation of water and the bad or imperfect vessel passed as a good one, while on the other hand it not unfrequently happens that bubbles caused by the agitated condition of the water the operator takes to be created by escaping air, and hence good vessels are thrown out as imperfect. These unavoidable mistakes not only cause serious delay to the working of the system, but greatly add to the expense of manufacture of cans, besides causing to be placed upon the market bad or imperfect cans. Consequently the importance of having the tester, which constitutes a vital point or feature of the can-making system, so constructed as to avoid possibility of such serious accidents happening, will be readily appreciated by those familiar with the can-making business. In order to overcome this most annoying defect in machinery of this class, we propose to so construct our tester that the liquid or water contained within the stationary tester-tank shall be given a continuously-rotating motion by the rotary travel of the spider-frame and vessel-carrying trucks and in allowing for the gradual submerging of the vessels to be tested therein during the rotation of the traveling trucks, thus overcoming agitation to the moving liquid by sudden vertical dip of the vessels and trucks within still water and consequent formation of bubbles to the surface thereof other than those created by the escape of compressed air from within the submerged vessels and providing against liable deception to the operator in ascertaining the difference between perfect and imperfect vessels, and in further allowing for the automatic discharge of the perfect and imperfect vessels from within the moving liquid without creating an agitated or broken condition of the water-surface.

Our invention also consists in so constructing the vessel-carrying trucks as to automatically seal the vessels held thereby for the purpose of receiving compressed air therein and in allowing for the gradual submerging of the truck and vessels, in providing mechanism whereby the trucks and vessels carried thereby are gradually raised from beneath the liquid bath, and in allowing for the automatic unlocking and discharge of the tested vessels from within the vessel-carrying trucks.

Figure 2:
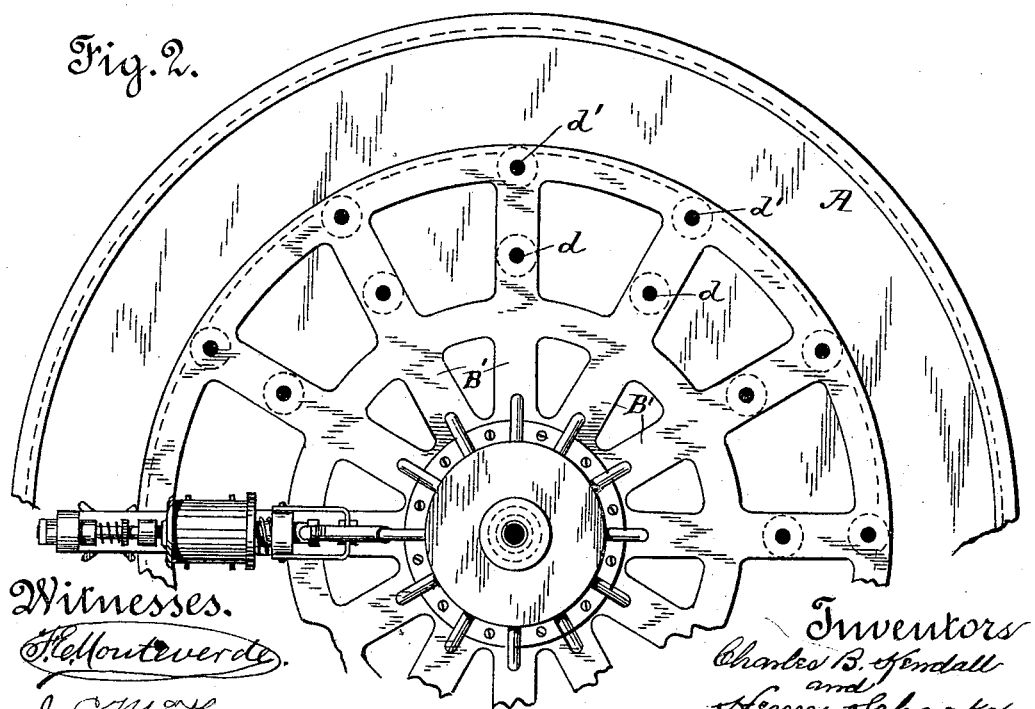
Figure 15:
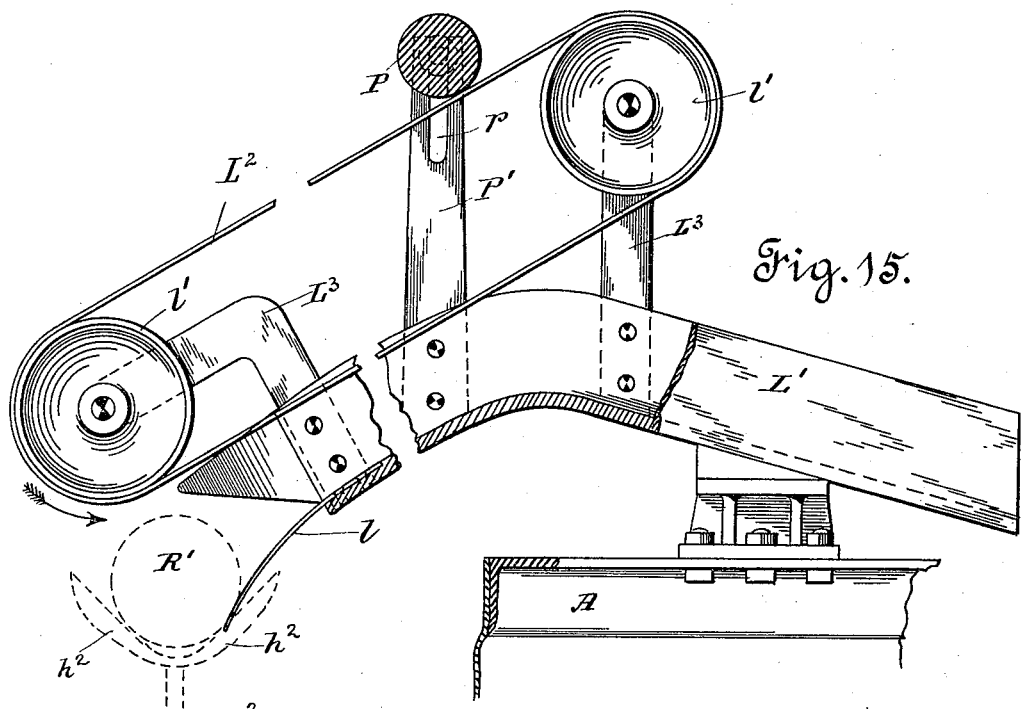
Figure 16:
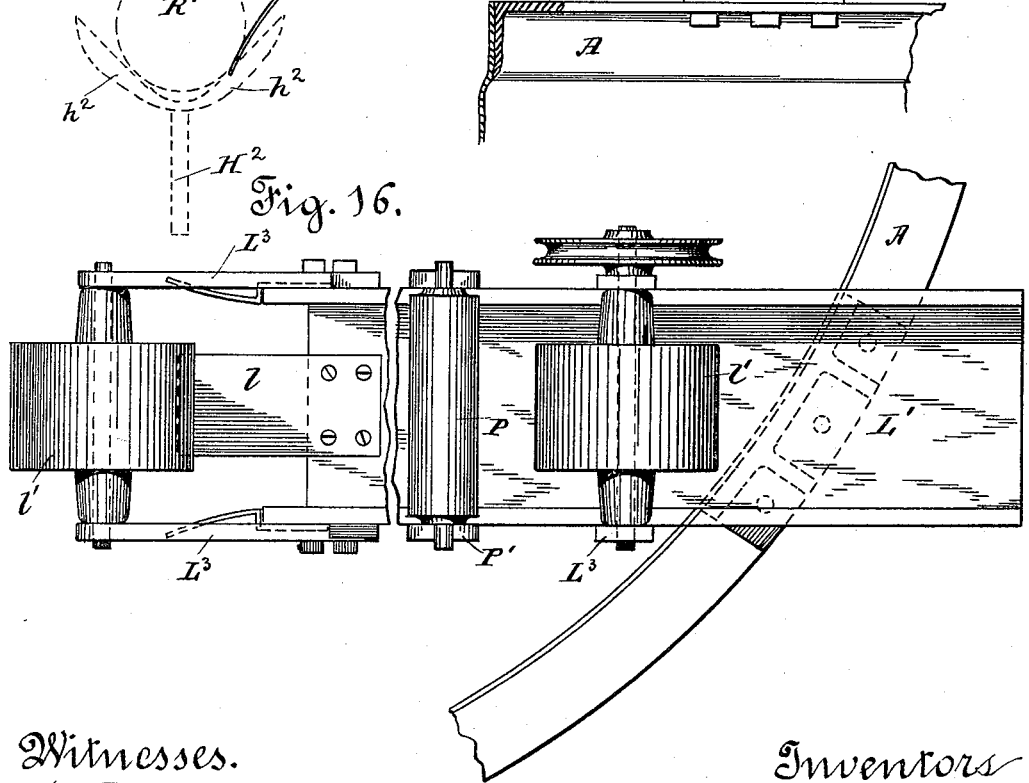

Referring to the drawings forming a part of this application, wherein similar letters and figures of reference denote corresponding parts throughout the entire specification and several views, Figure 1 is a cross-sectional elevation of the machine, showing the tank, traveling spider-frame, vessel-carrying truck, and mechanism for operating same; Fig. 2, a top plan view partly broken away; Fig. 3, a plan view of the stationary receiving-tank, showing feed and discharging chutes, trackways, and cams for throwing vessel-carrying trucks into locked and unlocked position; Fig. 4, a detail view showing portion of tank, lower portion of vessel-carrying trucks, and guide or guard for causing the downward movement of the truck in order to gradually submerge the retained vessel; Fig. 5, a cross-sectional elevation of the receiving-tank, partly broken away for the purpose of illustrating inclined trackway employed to gradually raise the traveling truck and submerged vessel above the bath prior to discharge of perfect and imperfect vessels; Fig. 6, an enlarged detail view showing one of the vessel-carrying trucks and operating-lever for shifting the traveling wheels from one line of trackway to the other, so as to cause discharge of tested vessels into proper chutes or conveyers designated for perfect or imperfect vessels; Fig. 7, a top plan of Fig. 6, showing operating-lever, movable sleeve, head-clamp and stem removed, and vessel from within heads of vessel-carrying truck; Fig. 8, a detail view of one of the vessel seats or holders; Fig. 9, a detail view of the movable sleeve; Fig. 10, an end view of Fig. 9; Fig. 11, an end view of Fig. 6; Fig. 12, a side elevation of the feed-chute for conveying vessels to the tester; Fig. 13, a top plan of Fig. 12; Fig. 14, a cross-sectional view taken on line $x$ $x$, Fig. 12; Fig. 15, a side elevation showing one of the discharge conveyers or chutes, and Fig. 16 a top plan thereof.

The letter A is used to indicate the stationary receiving-tank of the tester, which is mounted upon frame A', Fig. 1. Within this frame works the operating-shaft $a$, to the inner end of which is secured the bevel-gear $a'$, adapted to mesh with gear $b$, secured to vertical shaft $b'$, which works in bearing $c$. Consequently as shaft $a$ is operated in any well-known manner the motion thereof is imparted to vertical shaft $b'$ through the medium of gears $a'$ $b$. The vertical rotating shaft extends into the receiving-tank through stuffing-box $b^2$, and to the upper end thereof is secured the spider-frame B, which revolves within the receiving-tank with rotation of vertical shaft $b'$. This tank is filled with water to the height equal to the top of the spider-frame, and is prevented from escaping by means of stuffing-box $b^2$. It will thus be seen that the downwardly and outwardly extending arms B' of the spider-frame are always traveling beneath the surface of the water, and the rotation thereof serves to give circular motion to the water, inasmuch as the tank within which same is contained is circular in shape. Thus while the water is maintained in circular motion it presents an unagitated or still surface.

The spider-frame carries and supports a series of vessel-carrying trucks C, which are provided with upwardly-extending arms $c'$ $c^2$. These trucks have depending therefrom vertical rods C' C², which fit within openings $d$ $d'$, formed in arms B' of frame B and serve to hold the trucks in proper position. By suitable mechanism hereinafter described the vessel-carrying trucks are raised or lowered upon the spider-frame, so as to carry the vessel to be tested above or below the traveling water contained within the receiving-tank. The arms $c'$ $c^2$ are provided with openings $d^2$, Fig. 6, within one of which works the movable sleeve D, through which works the rearwardly-extending stem or rod D' of head D², which rod also works through opening formed in support D³. By means of nut $e$, which works upon outer end of rod D', we are enabled to adjust head D² as required. Upon this rod is located collar $e'$, and located upon said collar and inner end of movable sleeve D is spiral spring $e^2$, which is adapted to exert a constant pressure upon adjustable sleeve D, in order to insure same bearing firmly against securing-nut $e$ of the rearwardly-extending rod D'. The pressure of this spring serves by bearing against collar $e'$ to shift the head D² inward as the movable sleeve is thrown forward by the operating-cam. Through the opening formed in arm $c^2$ works rearwardly-extending rod or stem E of head E', which is maintained in its forward position through the medium of spiral spring E². The forward or backward movement or adjustment of stem E and head E' is limited by means of set-screw $e^4$, which passes through top of arm $c^2$. To the outer end of said stem is secured cap E³, which has air-passage way $e^5$ formed therein, Fig. 6, and to shoulder $f$ of this cap is secured cup $f'$, which forms a stuffing-box $f^2$. The rearwardly-extending stem E is constructed hollow, and within the same works piston-rod E⁴, which passes through opening in cap E³, stuffing-box $f^2$, and supporting brace or strap F, which is secured to upper end of arm $c^2$. To the outer end of the piston are secured lock-nuts F', by means of which we can readily adjust the piston in or out, as desired. The inner end of hollow stem E is closed by piston-head $f^3$. The inner face of the clamp-head E' is provided with a rubber ring F², which insures an air-tight seal for the vessel when held between the clamping-heads D² E', as hereinafter more fully set forth.

To the projecting stem F³ of cap E³ is connected one end of air-hose $f^4$, the opposite end of which is secured to pipe $h$, leading from air-chamber H, Fig. 1. This chamber is filled with compressed air from any well-known air-pump located at one side of the machine and which is connected to receiving-pipe H', which pipe extends through stuffing-box $h'$, so as to provide against escape of air from within the chamber during rotation thereof with travel of the spider-frame. Fastened to the vessel-carrying trucks and projecting upwardly between the clamping-heads are the vessel-seats, which consist of the inclined arms $h^2$ and rod H², Fig. 8. By making the arms inclined we allow for seating of varying-sized vessels. These seats are made adjustable within openings formed in truck C by means of set-screws or nuts $h^3$. (Shown fully in Fig. 1.) Through an opening formed in the outer portion of the traveling trucks works the vertical cam-rod I, to the lower end of which is rigidly secured the operating-cam I', the arms of which during rotary travel of the vessel-trucks carried by the spider-frame contact with suitable cams located within the receiving-tank in order to lock or unlock the clamping-heads automatically, as will be fully set forth hereinafter. This cam, owing to its peculiar shape, may, more properly speaking, be termed a "turnstile-cam." The upper end of the vertical cam-rod has secured thereto plate $I^2$, which is provided with groove $i$. By reference to Fig. 7 it will be seen that both the plate and groove $I^2$ $i$ we make of elliptical shape. Within the elliptical groove works roller $i'$, which is connected to movable sleeve D by means of stem $i^2$. As plate $I^2$ is turned or moved by throw of cam I', partly rotating rod I, movable sleeve D is drawn inward by means of roller $i'$, contacting with side of groove $i$, and the movement of which forces stem D' and clamping-head forward, inasmuch as spiral spring $e^2$ bears against collar $e'$. As the cam is returned to position shown in Fig. 7 said spring serves to force movable sleeve, stem, and clamping-head outward, which will be fully explained. In order to provide against movable sleeve D turning within opening formed in arm $c'$, there is provided the key or pin $i^3$, which projects from said arm and is adapted to pass through opening $i^4$, formed in ear $i^5$ of the sleeve. It will thus be seen that while said sleeve is allowed forward and backward adjustment it is prevented from turning, consequently overcoming liability of guide-roller $i'$ moving from within groove $i$, which it would have a tendency to do in case said sleeve were allowed to turn.

To the lower end of vertical rods C' $C^2$ is secured frame J for shifting wheels J' $J^2$, fastened to axle $J^3$, which is movably held within frame J. The wheels are made so as to shift in order to be thrown within line of suitable trackways located in receiving-tank, in order to allow for discharge of tested vessels into appropriate chutes designated for perfect and imperfect vessels. Movable axle $J^3$, carrying wheels J' $J^2$, is shifted in or out within frame J by means of operating-lever $J^4$, which is pivoted to guide-piece $j$, rigidly secured to the axle. This operating-lever works through slot $j'$, formed in truck C, which forms the fulcrum-point, so that as the same is thrown from side to side axle $J^3$ is shifted in or out of frame J.

Within the receiving-tank A and to the bottom thereof is secured a series of trackways K K' $K^2$, the former of which gradually inclines downward, while the latter inclines upward for a given distance. The upwardly-inclined trackways lead to two separate discharge-chutes, one for carrying off of perfect cans, while the other carries the imperfect cans from the vessel-carrying trucks during rotation of the spider-frame. Trackway K' runs at an incline from end 1 to joint 2, from whence it runs at a level, Fig. 3, and is used for the purpose of directing or conveying the perfect cans or vessels to discharge-chute L, while trackway $K^2$ runs at an incline its entire length and directs the imperfect cans or vessels to chute L'. It will be observed that track K' commences somewhat in advance of trackway $K^2$. Consequently when roller or wheel $J^2$ is shifted to said trackway, the submerged vessels do not rise above the water contained in receiving-tank until after the submerged trucks have passed beyond mouth of discharge-chute L, while when traveling upon trackway K' the vessels are raised above the water when point 2 is reached. The downgrade trackway K is provided with flange $k$, beneath which wheel J' travels. Consequently as the spider-frame rotates, this flange bears upon said wheel, and inasmuch as the trackways incline downward it is obvious the vessel-carrying trucks are gradually carried downward until the vessels held between the clamp-heads are entirely submerged and are thus kept until raised by travel upon either of the inclined trackways, which carries them above the water.

The feed-chute for the tester consists of the open framework M, united by brace-pieces M'. To the bottom of the chute we secure tracks $m$, which form the runway for the traveling vessels, while to the sides of the chute are secured guides $m'$, which serve to maintain the traveling vessel in true line. As will be noticed by reference to Fig. 12, the feed-chute are secured to and above the receiving-tank by support $M^2$ and runs upon an incline. Within the lower end thereof works the delivery-wheel N, the periphery of which is cut away so as to form a series of vessel-body seats or rests $n$. Motion is imparted to this wheel through the medium of sprocket or pulley wheel N', mounted upon axle $n'$ outside the chute and which is operated in any well-known manner. As the delivery-wheel rotates, the traveling vessels drop into seats $n$, formed therein, and are carried thereby and allowed to fall between arms of the adjustable seats secured within the trucks C between clamping-heads $D^2$ and E'. As vessels become seated, the clamps are brought forward, so as to firmly bear against the vessel-heads by means of the operating-cams I', the arm of which during rotation of the spider-frame and trucks contact with cam O, secured to inner side of receiving-tank, which gives a quarter-throw (more or less) to operating-cam. With this throw of said cam elliptical head-plate $I^2$ is turned correspondingly, which causes sliding sleeve D to be carried forward, inasmuch as roller $i'$, secured thereto, contacts with wall of elliptical groove $i$, formed in said plate. This forward movement of the sliding sleeve D forces stem D' and clamping-head inward, the latter of which with its movement contacts with one end of the vessel and causes the other to bear tightly against elastic ring F², secured to inner face of clamp-head E'. Owing to the pressure exerted on clamp-head E' by reason of the seated vessel bearing thereagainst, due to the forward adjustment of clamping-head D², the spring E² is compressed and clamp E' allowed an outward movement. This adjustment unseats the piston-head $f^3$ and allows the compressed air to escape from the air chamber or reservoir H into pipe $h$ and hose $f^4$, and thence within air-passage $e^5$ of cap E³ and through hollow stem E into the clamped vessel or can until the same is completely filled. While the vessel-body is being filled with compressed air the spider-frame and vessel-carrying trucks are being revolved, and during the movement thereof roller or wheel J' passes beneath flange $k$ of trackway K, and inasmuch as the same runs at a gradual down incline it is obvious that the vessel-carrying trucks are forced downward to such a depth as to completely submerge the clamped air-filled vessel. In case the vessel should be leaky or imperfect the escape of compressed air from within the vessel will cause bubbles to form, in which case the, operator throws operating-lever to the left (position not shown,) which shifts axle J³ until roller or wheel J² is in line with trackway K². In this case, as the vessel-carrying mechanism continues its travel, wheel J² enters upon trackway K², and as the same runs upon an incline or upgrade the vessels carried thereby are gradually raised above the level of the water, so as to be ready to enter discharge-chute L'. However, just prior to coming in front of said chute the projecting arms of operating-cam I' contact with cam O', secured to inner wall of receiving-tank, and the travel of spider-frame causes same to receive another quarter-throw to that imparted by cam O, consequently likewise rotating plate I² and allowing sliding sleeve to return to position shown in Fig. 6. The pressure of spring $e^2$ being removed from stem D', the same necessarily moves outward and draws clamping-head D² therewith, thus causing the unlocking of the vessel. When pressure is removed from clamping-head D², the resiliency of spring E² serves to move clamping-head E' forward and causes piston-head to become firmly seated, thus checking flow of air through hollow stem E. As the traveling trucks pass fixed cam O', the unclamped or unlocked vessels are engaged by apron or tongue $l$, forwardly projecting from discharge-chute L', Fig. 15, and as the trucks continue to rotate apron or tongue $l$ raises the vessel from its seat until engaged by endless traveling belt L², working over pulleys $l'$, secured between supports L³, fastened to the discharge-chute. The travel of endless belt serves to carry tested vessels up said chute, from whence they are discharged into suitable receptacles located at the outer end thereof for this purpose. As the traveling trucks pass the mouth of discharge-chute L', wheel J² contacts with flange of trackway-cam K³, which may be said to constitute level of trackway K². It will be noticed, however, that said trackway-cam has a greater outer curve than inclined track portion K². Consequently as wheel J² travels thereon sliding axle J³ is gradually shifted within frame J until by the time end of said track is reached wheel J' is in line of trackway K, which brings the trucks and vessel holders or seats H² in direct line with delivery-chute, so as to receive vessel dropped therefrom. In case the vessel held between the clamping-heads is a perfect one, the air compressed therein when the vessel is submerged cannot escape. Consequently no disturbance of the surface of moving water takes place. The operator then leaves operating-lever in position shown in Fig. 6, which places wheel J' in line with trackway K'. During rotation of traveling trucks wheel J' moves upon trackway K', and inasmuch, as before stated, said trackway runs upon an upgrade the submerged vessel and clamping-heads are gradually raised above surface of traveling water. When the vessels have been carried above the water, one arm of movable cam I' contacts with fixed cam O², which serves to unclamp the vessels, in manner previously described, by cam O', which places said vessels so as to be lifted by projecting apron or tongue $o$ of discharge-chute L, in order to be engaged by traveling belt working over pulleys similar to that working in chute L', and by means of which the vessels are discharged, as previously described. In order to maintain an even tension upon traveling belts working within discharge-chutes, we provide self-adjusting roll or weight P, which works in slots $p$, formed in vertical support P' and bears upon traveling surface of said belts. By this means slack of either belt is compensated for and an even bearing of same upon the tested vessels maintained. (Fully shown in Fig. 15.) Owing to the number of vessel-carrying trucks carried by the rotating spider-frame the operator may ofttimes fail to throw the operating-lever J⁴ sufficiently far to give shift to the sliding axle J³ necessary to place the wheel J² in line with trackway K², and in order to impart necessary shift thereto in case of such failure we provide the frog $r$, which is secured rigidly to bottom of receiving-tank somewhat in advance of the trackways. (Shown in Fig. 3.) As the spider-frame rotates within said tank, guide-piece $j$, secured to axle J³, will contact with frog $r$, Fig. 6, and cause the sliding axle to move it full distance in order to cause wheels J' J² to run upon trackway designated for perfect and imperfect vessels.

It will be observed that continuous rotary motion is imparted to water contained in the receiving-tank by the movement of the rotary traveling mechanism working therein. Consequently while we impart continuous rotary motion to the retained water it is uninterrupted or unbroken, and by reason of the fact that vessel-carrying trucks are gradually lowered and raised therein while carried by the rotary traveling trucks it is obvious that the vessels to be tested are submerged and raised from within the moving water without causing agitation thereof, thus overcoming liability of operator being deceived by taking the bubbles created from an agitated condition of the water for those formed by escapement of air from the vessels submerged, and vice versa, consequently passing imperfect vessels for perfect ones and perfect for imperfect. By our machine while the vessels are tested in a continuous rotating moving body of water the surface of the same is maintained in a smooth and unagitated condition by reason of the fact that the entrance and exit of the vessels are made gradually while traveling in direction corresponding with the moving bath and not by a sudden plunge or dip, as heretofore, which agitates the surface of the water.

By reference to Fig. 12 it will be seen that a conveying-chute is provided with a gravity spring-cover R, which is designed for the purpose of preventing the cans or vessels R' from jumping out or jamming in lower end of chute. In case the vessels crowd too rapidly to be carried away by delivery-wheel cover R will be raised so as to make room therefor and at the same time will prevent the vessels being forced over the sides of the chute. When delivery-wheel has cleared away the crowded vessels, cover R falls by gravity or is closed by spring-pressure. This cover is secured to and above the chute by means of a strap $R^2$. Said cover consists of spring metal, which will readily give to pressure exerted on under surface thereof. As the cans rapidly travel within conveying-chute to delivery-wheel, it frequently happens that they crowd one upon the other, and thus bunch within lower end thereof. This bunching serves to unseat vessel held within seat of delivery-wheel, and thus retards delivery thereof to holding mechanism of tester. If no cover is provided, the crowding or bunching would force the vessels over sides of the chute, while if a fixed immovable one is secured to said chute the crowded vessels are liable to be mashed. However by providing a spring-cover, the same will lift or raise sufficiently high to overcome crowding and permit carrying away of same by delivery-wheel. In the figures we show the cover in its lifted position. To the lower end of the chute is fastened guide-trough $R^3$, which serves to maintain the vessels within peripheral seats of rotating wheel N until said wheel has turned sufficiently far as to allow the vessels dropping into seats formed by arms of adjustable vessel-holders $H^2$, carried thereunder by traveling trucks.

The mechanism employed for imparting motion to the tester-traveling mechanism and rotary delivery-wheel is so regulated as to be uniform—that is to say, the travel of the vessel-carrying trucks is so adjusted as to bring the vessel-holders beneath guide-trough, so as to receive vessel dropped from delivery-wheel N.

In Fig. 1 is shown one of the vessel-carrying trucks and vessel clamped and carried thereby submerged and one above the level of traveling water, with arm of operating-cam contacting with one of the releasing-cams for the purpose of unclamping or unlocking the vessel from between the clamping-heads, while in Fig. 6 is shown position of vessel, clamping-heads, &c., prior to being locked or clamped.

We are aware that minor changes may be made in the arrangement of parts and details of construction herein shown and described without necessitating or creating a departure from the nature and scope of our invention.

Having thus described our invention, what we claim as new, and desire to secure protection in by Letters Patent of the United States, is—

1. In a testing-machine for sheet-metal vessels, the combination, with a stationary receiving-tank containing liquid bath for the vessels, of rotating vessel-carrying trucks traveling within the tank and imparting motion to the liquid bath, mechanism for clamping and filling the clamped vessels with compressed air secured to the traveling trucks, and mechanism for automatically submerging the vessels within the bath and raising the same therefrom while the bath is in continuous motion, as and for the purpose set forth.

2. In a testing-machine for sheet-metal vessels, the combination, with mechanism to automatically clamp the vessels and connect them with a compressed-air supply, of a stationary receiving-tank containing a horizontally-moving liquid bath and mechanism for automatically submerging the vessels within the bath and raising same therefrom while the bath is kept in continuous motion, as and for the purpose set forth.

3. In a testing-machine, the combination, with the stationary receiving-tank, said tank containing a liquid bath, of a frame rotating within the tank, vessel-carrying devices secured thereto and carried thereby, said frame and carrying devices with the rotation thereof imparting unagitated motion to the liquid bath, clamping devices for automatically securing the vessels and connecting them with an air-supply, and mechanism for automatically and gradually submerging the vessels within the bath and raising same therefrom while the bath is in continuous motion, as and for the purpose set forth.

4. In a testing-machine, the combination, with the receiving-tank containing a liquid bath for the vessels, of vessel-carrying trucks rotating within said tank and with the rotation imparting motion to the said bath, vessel-holders and clamps carried thereby adapted to receive and automatically clamp the vessels and fill same with air, and mechanism to automatically and gradually submerge the air-filled vessels within the liquid bath and raise same therefrom while the bath is kept in continuous motion, as and for the purpose set forth.

5. In a testing-machine, the combination, with the receiving-tank containing a moving liquid bath, of vessel carrying and clamping devices rotating within the bath and mechanism for automatically submerging the vessels within the horizontally-moving bath and raising same therefrom, as and for the purpose set forth.

6. In a testing-machine, the combination, with a delivery-chute, of a receiving-tank containing a moving liquid bath, vessel-carriers rotating within the tank and provided with vessel-holders, and clamps adapted to automatically receive, clamp, and fill the vessel with compressed air, and mechanism for automatically submerging the filled vessels within the moving bath and raising same therefrom, as and for the purpose set forth.

7. In a testing-machine, the combination, with the receiving-tank containing an unagitated moving liquid bath, of vessel carrying and clamping devices rotating within the tank and imparting motion to the bath, and mechanism for automatically and gradually submerging the vessels within the moving bath and raising same therefrom without disturbing or agitating the liquid, as and for the purpose set forth.

8. A testing-machine comprising the horizontally-movable frame, vessel carrying and clamping devices carried thereby, air-supply connected thereto, receiving-tank, within which the horizontally-traveling frame rotates, liquid bath contained within the tank and kept in motion by the rotating frame, and mechanism for automatically submerging the vessels within the moving bath and raising same therefrom, as and for the purpose set forth.

9. A vessel-tester consisting of a receiving-tank partially filled with a liquid bath, frame rotating horizontally within receiving-tank and carrying clamping devices, said frame during its rotation imparting motion to the liquid bath, and mechanism for first automatically and gradually submerging the traveling vessels and thence raising same above the moving water at different points, so as not to agitate the surface of the moving water, as and for the purpose set forth.

10. In a testing-machine for sheet-metal vessels, the combination, with a stationary receiving-tank containing a liquid bath, of mechanism for imparting rotary motion to the bath and mechanism for clamping and gradually submerging the vessels and raising same from within the continuously-traveling bath, as and for the purpose set forth.

11. In a testing-machine for vessels, the combination, with a stationary receiving-tank, said tank containing a liquid bath, of mechanism for imparting an unagitated continuous traveling movement to the testing-bath, as and for the purpose set forth.

12. In a testing apparatus for vessels, the combination, with the vessel-carrying trucks, of the spring-actuated clamping-heads and the automatic operating-cam for locking and unlocking the clamping-heads during travel of carrying-trucks, as and for the purpose set forth.

13. In a testing apparatus for sheet-metal vessels, the combination, with the vessel-carrying trucks, of the spring-actuated clamping-heads, compressed-air supply connected with one of said heads, and the operating-cam for locking the clamping-heads and filling the vessels with air and for unlocking the heads in order to release the vessels and at the same time close the air-supply during horizontal travel of carrying-trucks, as and for the purpose set forth.

14. In a testing apparatus, the combination, with the receiving-tank containing a liquid bath, of mechanism for imparting a continuous unagitated traveling movement thereto, vessel-holding trucks secured to the traveling mechanism, clamping-heads working therein, air-supply connected to one of the clamping-heads, and the operating-cam adapted to automatically lock the carried vessels between the clamp-heads and open the air-supply so as to fill same and to release the clamped vessels after passing through the testing-bath and close the air-supply, as and for the purpose set forth.

15. In a testing apparatus, the combination, with the vessel-carrying trucks, spring-actuated clamp-heads working therein, and movable sleeve working upon stem of one head, of the automatic cam adapted with the movement thereof to operate the movable sleeve so as to lock or unlock the vessel between clamp-heads, as and for the purpose set forth.

16. In a testing apparatus, the combination, with the delivery-wheel, of the traveling vessel-carrying trucks and the adjustable vessel-seats working within the trucks, as and for the purpose set forth.

17. In a testing apparatus, the combination, with the vessel-carrying trucks, of mechanism for imparting horizontal rotation thereto, clamp-heads secured thereto, one of said heads connected with an air-cylinder, mechanism for moving the heads in or out so as to automatically clamp or unclamp the vessels and fill same with air, and the feed-chute for supplying vessels to the trucks, as and for the purpose set forth.

18. In a testing apparatus, the combination, with the horizontally-traveling trucks, and clamp-heads secured thereto, of mechanism for automatically moving the clamp-heads in or out in order to lock or unlock the held vessel during rotary travel of the vessel-carrying trucks, as and for the purpose set forth.

19. In a testing apparatus, the combination, with the receiving-tank, said tank containing a liquid bath, of mechanism for holding the delivered vessel, having horizontal rotation within receiving-tank and imparting corresponding motion to the testing-bath, said holding mechanism adapted to be automatically raised and lowered gradually within the moving water, and mechanism for automatically locking the vessels and admitting air thereto prior to submerging same and unlocking the held vessels and closing the air-supply prior to discharge of same from within receiving-tank, as and for the purposes set forth.

20. In a testing apparatus, the combination, with a receiving-tank containing a liquid bath, of mechanism for imparting a continuous unagitated horizontal rotating movement thereto, vessel-carrying trucks carried thereby, feed-chute for supplying vessels to the tester, mechanism for automatically locking or unlocking the vessels between clamp-heads of the trucks, and devices for allowing the rotary traveling trucks to be gradually lowered or raised within the continuous traveling liquid bath, as and for the purpose set forth.

21. In a testing apparatus, the combination, with the vessel-carrying trucks, of the automatic operating-cam, vessel-clamp heads, and the movable sleeve operated by the automatic cam in order to lock or unlock the clamp-heads during travel of vessel-carrying trucks, as and for the purpose set forth.

22. In a tester, the combination, with the automatic operating-cam and guide-plate moved with the throw of the cam, of the movable sleeve connected to the guide-plate and carried in or out thereby in order to lock or unlock the clamp-heads, as and for the purpose set forth.

23. The combination, with the automatic operating-cam, of the guide-plate provided with groove, said plate rotated with throw of the cam, and movable sleeve provided with depending roller working within groove of guide-plate and adapted with rotation of said plate to carry the movable sleeve in or out in order to lock or unlock the clamp-heads for the vessels, as and for the purpose set forth.

24. The combination, with the spring-actuated sleeve and guide-plate to which said sleeve is connected, of the automatic operating-cam adapted by its throw to move the sleeve in or out so as to lock or unlock the clamp-heads, as and for the purpose set forth.

25. The combination, with the vessel-carrying trucks, of a tester of the movable sleeve working therein, pin or lug for preventing turning of the movable sleeve, and the automatic operating-cam for moving the sleeve in or out in order to lock or unlock the clamp-heads, as and for the purpose set forth.

26. In a testing apparatus, the combination, with vessel carrying-trucks, clamp-heads working therein, one of said heads provided with a spring-actuated hollow stem, piston-rod secured therein, and cap connected to outer end of hollow stem and provided with air-passage communicating with passage-way of hollow stem, of the air-chamber connected with the cap and mechanism for operating the opposite clamp-head, in order that the pressure thereof against vessel held against the heads will cause clamp-head E' to move outward in order to unseat piston-head and allow flow of air through hollow stem to vessel, as and for the purpose set forth.

27. In a testing apparatus, the combination, with the clamp-heads, of the vessel-carrying trucks, one of said heads provided with a hollow spring-actuated stem, said stem communicating with passage-way of an air-supply, and mechanism for automatically moving the opposite head forward or backward, in order that the pressure or removal of pressure upon held vessel will serve to cause backward or forward movement of head E', so as to control supply of air to the carried vessel, as and for the purpose set forth.

28. In a testing apparatus, the combination, with the clamping-heads for the vessel, of the rubber cushion or ring secured to one of said heads, adapted to form an air-tight seat for open end of vessel when pressed thereagainst by inward movement of opposite head, and mechanism for automatically imparting forward or backward movement to head $D^2$, in order to likewise move opposite head and cause air-supply to be opened or closed, as and for the purpose set forth.

29. In a testing apparatus, the combination, with the vessel-carrying trucks, tank within which same rotates, feed-chute for supplying vessels to the carrying-trucks, automatic operating-cam, and fixed cam secured to wall of receiving-tank with which operating-cam contacts and is thrown with travel of vessel-truck, of mechanism adapted with throw of automatic cam to lock and unlock the vessel between clamp-heads of vessel-carrying trucks during horizontal travel thereof, as and for the purpose set forth.

30. In a testing-machine, the combination, with a stationary tank, of fixed cam secured thereto, vessel-carrying trucks horizontally traveling within the tank, and automatic operating-cam carried thereby and with the movement thereof contacting with the fixed cam in order to lock the vessels carried by the trucks, as and for the purpose set forth.

31. In a testing-machine, the combination, with the receiving-tank provided with a series of fixed cams, of the traveling vessel-carrying trucks, and the operating-cam carried thereby and adapted with the travel of same to contact with the fixed cams and by the throw imparted locking or unlocking the clamp-heads, as and for the purpose set forth.

32. In a testing apparatus, the combination, with the stationary tank for reception of tester-bath, of the horizontally-rotating mechanism traveling therein, vessel-carrying trucks carried thereby, raising and lowering devices for said trucks, and the inclined trackways secured to bottom of tank, as and for the purpose set forth.

33. In a testing apparatus, the combination, with the receiving-tank, of the vessel-carrying trucks having horizontal rotation within the tank, said trucks having vertical movement, frame secured to lower end thereof, sliding rod or axle working therein, wheels secured to outer ends thereof, operating-lever for shifting axle and wheels, and the inclined trackways located within bottom of tank and upon which wheels of sliding axle travel in accordance as to whether vessel is perfect or imperfect, as and for the purpose set forth.

34. In a testing apparatus, the combination, with the receiving-tank, of the inclined trackways, horizontally-rotating vessel-carrying trucks, and the shifting raising devices for the trucks, said device by moving upon either of the trackways serving to raise the submerged vessels, as and for the purpose set forth.

35. In a testing apparatus, the combination, with the tank, of inclined trackways, vessel-carrying trucks having horizontal rotation within the tank, said trucks adapted to be raised or lowered, sliding axle, guide secured thereto, and frog located within the tank and in line with guide-piece, as and for the purpose set forth.

36. The combination, with the shifting axle for guide-wheels, of a guide-piece projecting therefrom and frog located within bottom of tester-tank and with which guide of sliding axle contacts in order to impart full movement to the sliding axle, as and for the purpose set forth.

37. In a tester, the combination, with the vertically-moving vessel-carrying trucks, said trucks having horizontal rotary travel within the tank, of the downwardly-inclined guide-track secured to tank, guide-wheels secured to a sliding axle working thereunder, inclined tracks located within the tank for raising the submerged vessels, and devices for shifting the sliding axle in order to cause the guide-wheels to travel upon one of the inclined trackways, as and for the purpose set forth.

38. In a tester, the combination, with the receiving-tank containing a bath, of inclined trackways located therein, sliding axle secured to the horizontally-rotating mechanism provided with guide-wheels, and device for shifting the guide-wheels in line with one of the trackways, as and for the purpose set forth.

39. In a can-tester, the combination, with the tank, horizontally-rotating vessel-trucks, and sliding axle connected thereto, of the frog for insuring travel of guide-wheels upon proper trackways, as and for the purpose set forth.

40. The combination, with tester-tank, of the inclined trackway, as K', fixed cam, as O², horizontally-rotating vessel-carrying mechanism, and the automatic operating-cam adapted during its line of movement to contact with cam O² and unlock clamp-heads of vessel-carrying trucks, as and for the purpose set forth.

41. The combination, with inclined trackways secured within receiving-tank, of guide-frog and the shifting device connected to the horizontally-traveling trucks, as and for the purpose set forth.

42. In a tester, the combination, with tank, of horizontally-traveling vessel-trucks, inclined trackway secured within tank, as K², for raising of submerged imperfect vessels, operating-cam for unlocking the clamp-heads, so as to release the clamped vessels, releasing fixed cam, as O', adapted to engage operating-cam during travel of rotating trucks, and discharge-chute for imperfect vessels, as and for the purpose set forth.

43. In a testing apparatus, the combination, with the tank, of the horizontally-rotating vessel-carrying trucks, said trucks having vertical movement, and the inclined trackways for raising said trucks, so as to bring the submerged vessels above level of bath contained in tank, as and for the purpose set forth.

44. The combination, with the receiving-tank, of the horizontally-rotating vessel-holding trucks, said trucks having vertical adjustment, inclined trackways for raising submerged vessels in line with discharge-chute for imperfect vessels, automatic operating-cam connected by suitable devices to the clamp-heads, and fixed cams secured within the tank for operating said cam so as to lock and unlock clamp-heads, as and for the purpose set forth.

45. The combination, with the shifting mechanism, of the trackway-cam for moving guide-wheel in line with downwardly-inclined guide-track, as and for the purpose set forth.

46. The combination, with the horizontally-traveling vessel-carrying trucks, of the discharge-chute, vessel-holders secured to the traveling trucks, and outwardly-projecting tongue connected to the discharge-chute and adapted to unseat the tested vessels from rotating trucks and allow for discharge of same into chute, as and for the purpose set forth.

47. The combination, with a testing apparatus, discharge-chute, endless traveling discharging-belt working therein, and horizontally-rotating vessel-carrying trucks, of the outwardly-projecting tongue secured to inner end of chute and adapted during travel of trucks to unseat the tested vessel and raise same so as to become engaged by traveling belt, as and for the purpose set forth.

48. The combination, with the flexible projecting tongue of the discharge-chute, of vessel-carrying trucks provided with vessel-holders, said tongue adapted to raise the vessels from their holders or seats during rotation of the trucks, as and for the purpose set forth.

49. The combination, with the vessel-carrying trucks of a tester, of the projecting tongue connected to the discharge-chute, said tongue adapted to raise the vessels from their seats during travel of the trucks, and mechanism for receiving and carrying the same within discharge-chute, as and for the purpose set forth.

50. The combination, in a testing apparatus with the vessel-carrying trucks, of the vessel-delivery wheel provided with vessel-seats, and mechanism for imparting a uniform speed to traveling trucks and delivery-wheel, as and for the purpose set forth.

51. The combination, in a testing apparatus, with the vessel-carriers, of the feed-chute, vessel-seating delivery-wheel located therein for delivering the vessels to the carriers, and the spring-actuated cover for said chute, as and for the purpose set forth.

52. In a testing apparatus, the combination, with the vessel-carriers, feed-chute, delivery-wheel erected within inner end, spring-actuated door or cover for the chute, of mechanism for operating the delivery-wheel, as and for the purpose set forth.

53. In a testing apparatus, the combination, with the stationary tank, of horizontally-moving bath contained therein, horizontally-rotating vessel-carrying trucks, delivery-wheel for supplying vessels to the trucks, clamp-heads, automatic cam for locking and unlocking the vessels between clamp-heads through suitable connecting devices, cams located within the stationary tank for operating automatic cam during rotation of trucks in order to allow of locking and unlocking of clamp-heads, devices for submerging and raising the tested vessels, delivery-chutes for carrying off same, and mechanism for imparting travel to trucks, bath, and rotation to delivery-wheels, as and for the purpose set forth.

In testimony whereof we affix our signatures in presence of two witnesses.

CHARLES B. KENDALL.
HENRY SCHAAKE.

Witnesses:
N. A. ACKER,
J. C. McKEE.